United States Patent
Torri et al.

(10) Patent No.: US 7,754,878 B2
(45) Date of Patent: Jul. 13, 2010

(54) FREE-RADICAL FUNCTIONALIZED POLYSACCHARIDES

(75) Inventors: Giangiacomo Torri, Milan (IT); Angelo Alberti, Bologna (IT); Sabrina Bertini, Milan (IT); Gianluca Ciardelli, Pisa (IT); Giuseppe Gastaldi, Canneto Pavese/Pv (IT); Solitario Nesti, S. Baronto/Pt (IT); Elena Vismara, Milan (IT)

(73) Assignees: Next Technology Tecnotessile Societa Nazionale Di Ricerca R.L., Prato (IT); Instuto Scientifico Di Chimica E Biochimica "G. Rozoni", Milan (IT)

( * ) Notice: Subject to any disclaimer, the term of this patent is extended or adjusted under 35 U.S.C. 154(b) by 716 days.

(21) Appl. No.: 10/506,619

(22) PCT Filed: Mar. 20, 2003

(86) PCT No.: PCT/EP03/02910

§ 371 (c)(1),
(2), (4) Date: Sep. 14, 2004

(87) PCT Pub. No.: WO03/078471

PCT Pub. Date: Sep. 25, 2003

(65) Prior Publication Data

US 2005/0108832 A1    May 26, 2005

(30) Foreign Application Priority Data

Mar. 20, 2002  (EP)  .................. 02425172

(51) Int. Cl.
*D06M 11/50*  (2006.01)
*D06M 13/03*  (2006.01)
*C07H 7/02*  (2006.01)

(52) U.S. Cl. .................. 536/124; 8/115.51; 8/115.7; 8/116.1

(58) Field of Classification Search ............... 8/115.51, 8/115.7, 116.1; 536/124; *D06M 11/50, 13/03*
See application file for complete search history.

(56) References Cited

U.S. PATENT DOCUMENTS

| 3,558,596 | A | * | 1/1971 | Demott ...................... 536/61 |
| 4,017,257 | A | * | 4/1977 | Weil ...................... 8/115.52 |
| 4,806,125 | A | | 2/1989 | Dyer |
| 5,344,462 | A | | 9/1994 | Paskalov et al. |
| 6,187,391 | B1 | * | 2/2001 | Kataoka et al. ............. 427/569 |

FOREIGN PATENT DOCUMENTS

| CA | 2249955 | * | 4/2000 |
| DE | 93603 | | 11/1972 |
| TW | 429280 | | 4/2001 |

OTHER PUBLICATIONS

Ward et al., "Effect of rf Cold Plasmas on Polysaccharides", 1978, Surface Science, p. 257-273.*
Zara et al., "Grafting of industrial cellulose pulp using the Fe2+/H2O2 redox system as initiator", 1995, Tappi Journal, p. 131-134.*
Krässig "Graft Copolymerization onto Cellulose Fibers; A new Process for Graft Modification", 1971, Sven Papperstidn, p. 417-428.*
Shah et al. Journal of Applied Polymer Science, 1994, 51, p. 1421-1426.*
Bhattacharya et al. Prog. Polym. Sci., 2004, 29, p. 767-814.*
Van Dijk-Wolthuis et al. Macromolecules, 1997, 30, p. 3411-3413.*
Behnisch: "Plasmachemische Modifizierung Von Cellulose—Moglichkeiten und Grenzen"; Papier, Das, Eduard Roether KG. Darmstadt, DE; vol. 48, No. 12; Dec. 1, 1994; pp. 780-783; XP000478063.

* cited by examiner

*Primary Examiner*—Shaojia Anna Jiang
*Assistant Examiner*—Jonathan S Lau
(74) *Attorney, Agent, or Firm*—Katten Muchin Rosenman, LLP

(57) ABSTRACT

Polysaccharides are functionalized using a source of free radicals which forms stable radicals on the polysaccharides structure and wherein the formed radicals reacts with a functionalized unsaturated compound. The method comprises two steps: a first step, wherein the free radical on the polysaccharides chain is formed, and a second step, wherein said radical reacts with the unsaturated compound in the absence of the radical source.

11 Claims, No Drawings

FREE-RADICAL FUNCTIONALIZED POLYSACCHARIDES

The present invention relates to a new process for introducing functional groups on a large variety of polysaccharides by using free radical generation.

BACKGROUND OF THE INVENTION

High-energy irradiations have been used in several fields of application.

In the beginning the attention was on degradation processes of polymers. The chains were broken by high-energy irradiation with economical and ecological improvements and an exact process control via the dose was possible.

For instance, in the viscose process, studies on electron beam (EB) irradiation have been made by Fischer and Goldberg since 1980 (Patent DD 1 40747 and M. Lenzinger Ber., 1985, Issue 59, 32-39) and further investigation on the cellulose pulp were carried out by P. Burkart, (Polym. News, 1999, 24/6, 194-197). These studies opened a new route of commercial relevance to pulp activation in the viscose process which also has ecological advantages. With EB treatment on the cellulose pulp, degradation prevails by far on crosslinking and leads to a narrow chain length distribution and an enhanced accessibility of the cellulose, especially after alkali treatment.

More recently, the crosslinking route was investigated. In WO 01/30407, for example, a polyvinyl alcohol solution in water, containing natural polymers, can be cross-linked using high-energy irradiation to form hydrogels for use in the medical field; the products obtained by this process are described as having qualities of sterility, transparency, cooling effect, biocompatibility, oxygen permeability, absorption, humid environment.

The introduction of functional groups on the polysaccharide chain has been another object of several studies. In particular, studies have shown that it is of great importance the etherification and esterification of cellulose with functional groups to obtain fibers with improved qualities of resistance and applicability.

For instance, an esterification process for preparing polyanhydride cross-linked fibrous cellulosic products is claimed in WO 98/13545 [Amoco Corporation].

However a significant drawback of the esterified and etherified functional derivatives that makes them less attractive from a practical viewpoint is the low stability of ester bonds: in fact they are cleaved under alkaline conditions, as usually happens by repeated laundry, especially with strong detergents.

It is important to obtain functionalization of polysaccharides with functional groups that have stable bonds which, for example do not break in alkaline conditions, so that the polysaccharide does not degrade easily after it is washed with detergents.

European patent application 01830331 discloses a process to functionalize linen by introducing a stable bond at the O of the hydroxyl groups of the polysaccharide structure maintaining the allomorph I state.

However the state of the art does not report any example of functionalizing a polysaccharide by the formation of stable carbon-carbon bonds on the polysaccharide chain.

SUMMARY OF THE INVENTION

The present invention provides a new method of functionalizing polysaccharides using a source of free radicals which form stable radicals on the saccharide chain. These radicals react with an olefin, forming a stable carbon-carbon bond. If the unsaturated compound contains a functional group, this process results in the introduction of functional groups directly bonded to the saccharide chain through carbon-carbon covalent bonds.

In a preferred embodiment, the method is characterized by a first step, wherein the free radical on the polysaccharide chain is formed, and a second step, wherein said radical reacts with the unsaturated compound in the absence of the radical source.

Examples of radical sources usable in the first step are:

a chemical system, for example $H_2O_2/Fe^{++}$ plasma high-energy irradiation, for example electron beam irradiation (EB).

DETAILED DESCRIPTION OF THE INVENTION

The present invention provides a new method for functionalizing polysaccharides using a source or free radical which forms stable radicals on the polysaccharide structure. These radicals react with a functionalized olefin, forming a stable carbon-carbon bond between the polysaccharide and the precursor of the functional group.

The method is characterized by a first step, wherein the free radical on the polysaccharide chain is formed, and a second step, wherein said radical reacts with the olefin compound in the absence of the radical source.

In a further embodiment the invention provides new polysaccharides obtainable by the above process and characterized by the presence of functional groups bonded to the polysaccharide chain through carbon-carbon bonds.

In another embodiment the invention provides a process for the preparation of functionalised polysaccharides or polymer fibers which process comprises:

1. forming stable radicals on the polysaccharide from a free radical source; and
2. reacting in the absence of the free radical source an olefin containing a functional group with the stable radicals on the polysaccharide.

A large variety of polysaccharides can be functionalized using the present process. From the industrial point of view the preferred polysaccharides comprise starch or cellulose materials such as cotton, flax, viscose, paper or softwood pulp, or combinations thereof. They can also be used together with one or more natural or synthetic fibers such as, for example, silk, polyamide, polyester, polyacrylate and polyolefin.

By the term olefin we mean any suitable unsaturated (alkene or alkyne) compound capable of reacting with radicals to form a covalent bond.

The choice of the olefin compound depends on the functionalization to be introduced. The amount of olefin compound introduced in the second step of the process, depends directly on the desired lengths of the chain that will be attached to the polysaccharide chain.

Preferably, the polysaccharide is cellulose or a derivative thereof, more preferably a naturally sourced cellulose. In another embodiment of the invention, the polysaccharide is in the form of a fiber.

The present invention relates, for example, to the functionalization of flax with functionalized olefins such as glycidylmethacrylate (GMA) and allylglycidylether (AGE). Every kind of source which is able to generate free radicals, may be used. Preferred free radical sources are:

a chemical system, for example Fenton's reagent ($H_2O_2$/$Fe^{++}$)

plasma high-energy irradiation, for example electron beam irradiation (EB).

Hydrogen peroxide is reduced by $Fe^{2+}$ salts to hydroxyl radical and hydroxyl anion. As hydroxyl radical easily abstracts hydrogen atoms, Fenton's reagent can be considered a useful tool to generate carbon centred radical.

Plasma is a partially ionized gas that consists of ions, electrons, and neutral particles. It is well-known that the plasma treatment may be very efficient and useful to change permanently the surface properties of fibres in yarn or fabrics. It is therefore a suitable method to generate free-radicals on the surface of yarns and fabrics.

Electron beam irradiation is a radiochemical method convenient and effective, especially because of its moderate initiation reaction conditions, i.e. atmospheric pressure and room temperature. As the electron beam penetrates the matter, electron beam treatment can induce deep modifications of fibers.

In the case of Fenton's reagent, it is preferred to use a ratio mol $H_2O_2$/eq anh. glucose comprised between 100:1 and 1:1, more preferably between 50:1 and 5:1. The amount of $Fe^{2+}$ can vary considerably and the molar ratio $H_2O_2$/$Fe^{2+}$ varies generally between 1 and $10^5$, preferably between 10 and $10^4$.

Cold plasma irradiation can be performed in a broad range of conditions. Preferably the power is fixed in the range 50-500 W and the treatment is performed for a time comprised between a 10 seconds and 15 minutes, more preferably between 1 minute and 10 minutes. EB activation can be performed in a broad range of radiation energy. Preferably the energy can range from 100 keV to 5 MeV. However, since it is well known that it also induces depolymerization of the polysaccharide, it is convenient to use a radiation dose comprised between 10 and 400 kGy, preferably between 20 and 200 kGy, most preferably between 40 and 150 kGy. As indicated in Tables 10-12, the radicals generated on the polysaccharide are stable for a long period of time, with a half life time of about 1 day. As a consequence, it is possible to irradiate a polysaccharide and transport it to another plant where the second step is performed. Thus, the radiation dose will depend not only on the amount of functional groups to be introduced, but also on the time between the first and second step.

The type of olefin used is not particularly limited. In fact, although the stable radicals generated on the polysaccharide are generally definable as nucleophilic radicals, it is possible to add them either to electron-poor olefins such as GMA or to non activated olefins such as AGE.

Basically, the choice of the olefin will depend on several factors amongst which the most important will be the type of functional group that will be finally present on the polysaccharide. In fact, the glycidyl group of GMA and AGE can be further reacted according to well known methods of synthetic organic chemistry to give rise to a large variety of functional groups pending from the saccharide backbone.

The amount of functional groups introduced in the polysaccharide can be measured by the ratio mol olefin/eq anhydrous glucose. This ratio can vary in a broad range and is preferably comprised between $10^{-3}$ and 2, more preferably between $10^{-2}$ and 1.

EXPERIMENTAL PART

Characterization of the Products
EPR
Signals Observed for Irradiated Powder Samples of Polysaccharides Powdered flax was put inside a quartz tube of 4 mm internal diameter to reach about 15 mm height. The tube was weighted and the amount of flax ($w_x$) calculated (about 25 mg). All the measurements were taken using the following parameters:
Central Magnetic Field: 331.0 mT
Scan Width: 100 G
Number of points: 2048
Receiver Gain: 1e4
Modulation Amplitude: 0.1 mT
Atténuation: 15 dB.

The value of the signal intensity ($I_x$) was determined as following:

$$I_x = (\iint s_x \times 200 / w_x) \times \iint r_1 / \iint r_x$$

Where:
$\iint s_x$ is the spectrum double integrations of the of the Whole scan Range
$\iint r_x$ is the spectrum double integrations of the signal of a Standard crystal synthetic Ruby
$\iint r_1$ is the value for the first sample considered as Reference
NMR Solid state $^{13}C$ CPMAS spectra were recorded with a Bruker ASX-300 spectrometer equipped with a 7 mm WB CPMAS probe head. Samples were finely powdered, packed into 7 mm zirconia rotor and sealed with Kel-F caps. The spinning speed of the sample was 4 Khz.

The $\pi/2$ pulse was 3.7 µsec, the contact time for the cross-polarization experiment was 1.2 ms, and the relaxation delay was 6 s. Spectra were obtained with 1024 data points in the time domain, 512 scans were performed for each experiment.
FT-IR The samples were ground with infrared grade KBr in an agate mortar. 500 mg of KBr were mixed with the sample (2% w/w). The translucent discs, obtained by pressing the ground material with aid of a press, were analyzed in transmission with an IFS 25 Bruker spectrometer. 64 scans were sufficient for good resolution.

The ester characteristic signal was evaluated for every sample to define the real functionalization. The area of the ester band was normalized referring to another characteristic cellulose band:

$$\text{area}_{N(ester)} = [\text{area}_{ester}(\text{manual band integration}) / \text{area}_{cellulose}(\text{range } 780\text{--}465 \text{ cm}^{-1} \text{integration})] \times 100$$

Example 1

Activation by Fenton's Reagent and Functionalization with GMA

Comparative Run 1.1

In a three-neck round bottom flask, flax (Emerald Sliver, 0.807 g) powdered with a blade-mill, was dipped into a 50 ml of $H_2O$. 5.27 ml $H_2O_2$ 12 M were added to reach a concentration of 1.2 M. The mixture was warmed up to 80° C.

100 µl of a saturated $FeSO_4$ heptahydrate solution (5.62 $10^{-2}$ mmol, 9.0 $10^{-4}$ mol $Fe^{+2}$/mol $H_2O_2$) were added dropwise. The reaction lasted 30 min.

The solid material was removed, washed with abundant cool water and filtered.

Run 1.2

In a three-neck round bottom flask, Emerald Sliver (0.807 g) powdered with a blade-mill, was dipped into a 50 ml of $H_2O$. 5.27 ml $H_2O_2$ 12 M were added to reach a concentration of 1.2 M. The mixture was warmed up to 80° C. 100 µl of a saturated $FeSO_4$ solution (5.62 $10^{-2}$ mmol, 9.0 $10^{-4}$ eq $Fe^{+2}$/eq $H_2O_2$) was added dropwise. The reaction lasted 30 min.

The solid material was removed, washed with abundant cool water and filtered.

The obtained material was dipped into a methanol-water 1:1 solution (100 ml) containing glycidylmethacrilate (20% vol) and left reacting for one hour at 80° C. under argon flux. The reaction mixture was cooled, the solid was removed and washed with water-methanol at 80° C., then with water-methanol at room temperature, and finally three times with acetone at room temperature.

The material was dried in air until a constant weight was reached (1.497 g).

Run 1.3

In a three-neck round bottom flask, a little hank of Emerald Sliver (2.275 g) was dipped into 146 ml of water. $H_2O_2$ 40 vol % (14.6 ml=172 mmole, 12.44 (eq $H_2O_2$)/(eq Anhydrous glucose)) was added to reach a final concentration of 4% vol.

The mixture was warmed up to 80° C.

280 µl of a saturated $FeSO_4$ heptahydrate solution (15.7 $10^{-2}$ mmol, 9.0 $10^{-4}$ mol $Fe^{+2}$/mol $H_2O_2$) were slowly added.

The reaction lasted 120 min.

The solid material was removed, washed with abundant cold water and filtered.

A part of the obtained material (1.7751 g) was dipped into a methanol-water 1:1 solution (180 ml) containing glycidylmethacrilate (20% vol) and left reacting for one hour at 80° C. under argon flux.

The reaction mixture was cooled, the solid was removed and washed with water-methanol at 80° C., then with water-methanol at room temperature, and finally three times with acetone at room temperature.

The material was dried in air until a constant weight was reached (2.8924 g).

FIGS. 1, 2 and 3 show respectively the IR spectra of the Sliver before treatment, after treatment, and after reaction with GMA. It is possible to see that the treatment with Fenton's reagent does not produce any change in the IR spectrum, while reaction with GMA introduces a band at 1725 $cm^{-1}$, typical of the presence of an ester group.

TABLE 1

| Run | Time | $Fe^{2+}/H_2O_2$ mole/mole | GMA [M] | Reaction GMA/Aglu mol/mol | $area_{N(ester)}$ FT-IR |
|---|---|---|---|---|---|
| Comp. 1.1 | 30' | 9 × $10^{-4}$ | — | — | 7.2 $10^{-3}$ |
| 1.2 | 30' | 9 × $10^{-4}$ | 1.5 | 30 | 0.98 |
| 1.3 | 120' | 9 × $10^{-4}$ | 1.5 | 20 | 0.43 |
| 1.4 | 30' | 9 × $10^{-3}$ | 1.4 | 10 | 0.52 |

Example 2

Activation by Cold Plasma and Functionalization with GMA

Plasma Activation

A variable amount (5-12 g) of the starting material was treated with Cold Plasma (Power 200 W) at the pressure of 0.2 mbar under Argon.

The experiments were carried out under the following conditions.

The sample was put inside the chamber of the instrument on the appropriate support and the valve which connects the chamber to the rotative pump was open so that the Argon was stripped out of the sample and the pressure was decreased to 0.2 mbar. When the conditions were stabilized, the rf generator was put on (Power fixed on 200 W) to generate the discharge (Plasma Chamber). The Plasma treatment was carried out for 180 sec. Then the generator was put off and both the pomp valve and the Argon cylinder pin-valve were closed. Another valve was open to introduce air inside the chamber until atmospheric pressure was reached.

Comparative Run 2.1

A hank of Emerald Sliver (9.29 g), was treated with PLASMA. In Table 2 the value of $area_{N(ester)}$ is reported by comparison.

Run 2.2

In a tree-neck round bottom flask, a 300 ml solution of methanol-water 1:1 vol, containing AGE (20% vol), under nitrogen flux, was stirred for 30 min at 80° C.

A hank of Emerald Sliver (9.29 g), previously treated with PLASMA was added in the reaction solution; the mixture was left to react for five hours under these conditions and then cooled down. The solid material was recovered and treated for 30 min at 80° C. with 300 ml of methanol-water 1:1, for 30 min at room temperature with 200 ml methanol-water 1:1 and then washed three times with 200 ml of acetone.

The purified material was dried in air until a constant weight was reached (9.90 g).

Run 2.3

In a tree-neck round bottom flask, a 200 ml solution of methanol-water 1:1 vol, containing GMA (20% vol), under nitrogen flux, was stirred for 30 min at 80° C.

A hank of Emerald Sliver (2.87 g), previously treated with Plasma was added in the reaction solution; the mixture was left to react for one hour under these conditions and then cooled down. The solid material was recovered and treated for 30 min at 80° C. with 150 ml of methanol-water 1:1, for 30 min at room temperature with 150 ml methanol-water 1:1 and then washed three times with 100 ml of acetone.

The purified material was dried in air until a constant weight was reached: (2.99 g).

FIG. 1 shows the IR spectrum of Emerald Sliver without treatments. In FIG. 4 the IR spectrum of the functionalized Sliver is shown. It is possible to see the signal at 1726 $cm^{-1}$.

Comparative Run 2.4

A cotton fabric piece (cotton 100%, 5.63 g) was treated with Plasma. In Table 2 the value of $area_{N(ester)}$ is reported by comparison.

Run 2.5

In a tree-neck round bottom flask, a 200 ml solution of methanol-water 1:1 vol, containing GMA (20% vol), under nitrogen flux, was stirred for 30 min at 80° C.5

A cotton fabric piece (cotton 100%, 5.63 g), previously treated with Plasma was added in the reaction solution. The mixture was left to react for one hour under these conditions and then cooled down. The solid material was recovered and treated for 30 min at 80° C. with 150 ml of methanol-water 1:1, for 30 min at room temperature with 150 ml methanol-water 1:1 and then washed three times with 100 ml of acetone.

The purified material was dried in air until a constant weight was reached (5.79 g).

Comparative Run 2.6

A mixed cotton fabric piece (cotton 52%, viscose 43%, elastan 5%, 10.52 g), was treated with Plasma. In table 2 the value of $area_{N(ester)}$ is reported by comparison.

Run 2.7

In a tree-neck round bottom flask, a 300 ml solution of methanol-water 1:1 vol, containing GMA (20% vol), under Nitrogen, was stirred for 30 min at 80° C.

A mixed cotton fabric piece (cotton 52%, viscose 43%, elastan 5%, 10.52 g), previously treated with Plasma was added in the reaction solution. The mixture was left to react for one hour under these conditions and then cooled down. The solid material was recovered and treated for 30 min at 80° C. with 250 ml of methanol-water 1:1, for 30 min at room temperature with 250 ml methanol-water 1:1 and then washed three times with 200 ml of acetone.

The purified material was dried in air until a constant weight was reached (10.61 g).

Example 3

Activation of Emerald Sliver with EB and Functionalization with GMA and AGE

Activation by Electron-Beam (EB)

A variable amount (0.5-20 g) of the material to irradiate was treated with Electron Beam (radiation dose 20-400 kGy). Irradiations were carried out by putting the sample on the rotating cylinder. The samples were put inside mylar (PET) pocket.

The radiation dosing was made before irradiating using a Crosslinking-DOSE READER DR 020. The cylinder rotated at the frequency of 1 turn/10 s, and the obtained dose/turn values were about 8 kGy (with an Electron Beam of 300 keV Energy and 2 mA Current).

Run 3.1

In a tree-neck round bottom flask, a 200 ml solution methanol-water 1:1 vol, containing GMA (5% vol), under Nitrogen flux, was stirred for 30 min at 80° C.

A hank of Emerald Sliver (4.23 g), previously treated with Electron Beam (20 kGy) was added to the solution and the reaction kept thermostated and under stirring for an hour. The mixture was then cooled down. The solid material was recovered and treated for 30 min at 80° C. with 150 ml of methanol-water 1:1, for 30 min at room temperature with 100 ml methanol-water 1:1 and then washed three times with 150 ml of acetone.

The purified material was dried in air until a constant weight was reached (4.3856 g).

Runs 3.2-3.13

The runs were performed according to the general procedure described for run 3.1, according to the conditions specified in table 3.

FIG. 5 shows the NMR $^{13}$C spectrum of run 3.7 wherein it is possible to see that flax remains in the allomorph state I.

TABLE 2

| Run | Material | Olefin [M] | Time before reaction | Reaction Olefin/Aglu mol/mol | Product Olefin/Aglu | $area_{N(ester)}$ FT-IR |
|---|---|---|---|---|---|---|
| Comp. 2.1[2] | Emerald Sliver | — | — | — | — | $6.87 \times 10^{-3}$ |
| 2.2 | Emerald Sliver | AGE 1.60 | | 9 | $9.2 \times 10^{-2}$ | — |
| 2.3 | Emerald Sliver | GMA 1.50 | 1 day | 16 | $5.0 \times 10^{-2}$ | $3.73 \times 10^{-2}$ |
| Comp. 2.4[2] | Cotton 100% | — | — | — | — | $5.8 \times 10^{-3}$ |
| 2.5 | Cotton 100% | GMA 1.50 | 1 day | 8.5 | $3.3 \times 10^{-2}$ | $3.57 \times 10^{-2}$ |
| Comp. 2.6[2] | Cotton 52% Viscose 43% Elastan 5% | — | — | — | — | $1.64 \times 10^{-3}$ |
| 2.7 | Cotton 52% Viscose 43% Elastan 5% | GMA 1.50 | 6 days | 8.5 | $0.93 \times 10^{-2}$ | $0.67 \times 10^{-2}$ |

[1]Determinated by weighing.
[2]Only plasma activation.

TABLE 3

| Run | EB Activation | area$_{N(ester)}$ FT-IR | Time Before reaction | Olefin [M] | Reaction Olef./Aglu mol/mol | Product Olefin/Aglu[1] mol/mol | area$_{N(ester)}$ |
|---|---|---|---|---|---|---|---|
| 3.1 | 20 kGy - N$_2$ | 1.05 × 10$^{-2}$ | — | GMA 0.35 | 3.0 | 4 10$^{-2}$ | 6.3 10$^{-2}$ |
| 3.2 | 40 kGy - N$_2$ | 1.79 × 10$^{-2}$ | — | GMA 0.35 | 3.0 | 0.40 | 0.46 |
| 3.3 | 60 kGy - N$_2$ | 1.3 × 10$^{-2}$ | — | GMA 0.35 | 3.0 | 0.47 | 0.47 |
| 3.4 | 80 kGy - N$_2$ | 1.55 10$^{-2}$ | — | GMA 0.35 | 3.0 | 0.80 | 0.79 |
| 3.5 | 80 kGy - air | 1.2 × 10$^{-2}$ | — | GMA 0.35 | 3.0 | 0.66 | 0.62 |
| 3.6 | 100 kGy - N$_2$ | 9.4 × 10$^{-3}$ | — | GMA 1.40 | 6.0 | 1.1 | 0.9 |
| 3.7 | 100 kGy - N$_2$ | nd | 19 days | GMA 0.35 | 3.0 | 0.3 | 0.37 |
| 3.8 | 150 kGy - N$_2$ | 1.3 × 10$^{-2}$ | — | GMA 0.35 | 3.0 | 1.1 | 0.7 |
| 3.9 | 200 kGy - N$_2$ | nd | 11 days | GMA 0.35 | 3.0 | 1.2 | 0.95 |
| 3.10 | 200 kGy - N$_2$ | nd | 18 days | GMA 0.35 | 3.0 | 0.58 | 0.51 |
| 3.11 | 400 kGy - N$_2$ | nd | 1 day | GMA 1.70 | 20.0 | 12.5 | 12.0 |
| 3.12 | 400 kGy - N$_2$ | nd | 7 days | GMA 0.35 | 10.0 | 2.9 | 2.3 |
| 3.13 | 100 kGy - N$_2$ | nd | — | AGE 2.00 | 7.0 | 3.71 10$^{-2}$ | Nd |

[1]By weighing
nd = not determined

Comparative Example 4

Activation with EB of Flax Impregnated with GMA

Flax hank was impregnated with solutions of GMA under stirring for 2 hours.

The hank was removed, and dried several hours in air until a constant weight was reached. The material was treated under nitrogen with Electron Beam, dose 50-100 kGy. The irradiated material was exhaustively washed with water-methanol at 80° C., then with water-methanol at room temperature, and finally with acetone (three times) at room temperature. The material was dried in air until a constant weight was reached.

Table 4 reports the results obtained by this procedure and proves that the use of a single-step procedure does not lead to introduction of functional groups on the polysaccharide.

TABLE 4

| Run | GMA in acetone % | Wt increase hank flax after impregn. | EB (kGy) | Product GMA/Agluc[1] mol/mol | area$_{N(ester)}$ FT-IR |
|---|---|---|---|---|---|
| 4.1 | 10 | 18% | 50 | nd | 0.86 × 10$^{-2}$ |
| 4.2 | 10 | 20% | 100 | 1.17 × 10$^{-2}$ | 1.16 × 10$^{-2}$ |
| 4.3 | 20 | 56% | 50 | 2.2 × 10$^{-2}$ | 2.52 × 10$^{-2}$ |
| 4.4 | 20 | 60% | 100 | 3.26 × 10$^{-2}$ | 3.0 × 10$^{-2}$ |

[1]By weighing after reaction and repeated washings
nd = not determined

Example 5

Activation with EB and Functionalization of Quartz Sliver with GMA

Run 5.1

In a tree-neck round bottom flask, a 300 ml solution of methanol-water 1:1 vol, containing GMA (5% vol), under nitrogen flux, was stirred for 30 min at 80° C.

A hank of flax (Quartz Sliver, 5.15 g), previously treated with Electron Beam (100 kGy) was added in the reaction solution. The mixture was left to react for one hour under these conditions and then cooled down. The solid material was recovered and treated for 30 min at 80° C. with 150 ml of methanol-water 1:1, for 30 min at room temperature with 100 ml methanol-water 1:1 and then washed three times with 150 ml of acetone.

The purified material was dried in air until a constant weight was reached (5.99 g).

Run 5.2

In a tree-neck round bottom flask, a 150 ml solution methanol-water 1:1 vol, containing GMA (20% vol), under Nitrogen flux, were stirred for 30 min at 80° C.

A hank of Quartz Sliver (5.5 g), previously treated with Electron Beam (100 kGy) was added in the reaction solution. The mixture was left to react for one hour under these conditions and then cooled down. The solid material was recovered and treated for 30 min at 80° C. with 150 ml of methanol-water 1:1, for 30 min at room temperature with 100 ml methanol-water 1:1 and then washed three times with 150 ml of acetone.

The purified material was dried in air until a constant weight was reached (13.8 g).

Run 5.3

In a tree-neck round bottom flask, a 200 ml solution methanol-water 1:1 vol, containing AGE (5% vol), under Argon flux, was stirred for 30 min at 80° C.

A hank of Quartz Sliver (5.52 g), previously treated with Electron Beam (100 kGy), was added in the reaction solution. The mixture was left to react for one hour under these conditions and then cooled down. The solid material was recovered and treated for 30 min at 80° C. with 150 ml of methanol-water 1:1, for 30 min at room temperature with 100 ml methanol-water 1:1 and then washed three times with 100 ml of acetone.

The purified material was dried in air until a constant weight was reached (5.55 g).

TABLE 5

| Run | EB (kGy) | Olefin [M] | Time before funct. | Reaction Olefin/Aglu mol/mol | Product Olefin/Aglu mol/mol[1] | area$_{N(ester)}$[2] FT-IR |
|---|---|---|---|---|---|---|
| 5.1 | 100 | GMA 0.35 | — | 3.0 | 0.18 | 0.17 |
| 5.2 | 100 | GMA 1.20 | — | 6.0 | 1.7 | 1.58 |
| 5.3 | 100 | AGE 2.50 | — | 9.0 | $1.47 \times 10^{-2}$ | — |
| 5.4 | 400 | GMA 0.35 | 12 days | 3.0 | 1.5 | 1.42 |

[1]By weighing
[2]area$_{N(ester)}$ not-treated sliver: $4.29 \times 10^{-3}$

Example 6

Activation of Emerald Yarn with EB and Functionalization with GMA

In a tree-neck round bottom flask, a 50 ml solution methanol-water 1:1 vol, containing GMA, under nitrogen flux, was stirred for 30 min at 80° C.

A hank of flax fiber (Emerald Yarn) previously treated with Electron Beam (400 kGy) was added in the reaction solution. The mixture was left to react for one hour under these conditions and then cooled down. The solid material was recovered and treated for 30 min at 80° C. with 150 ml of methanol-water 1:1, for 30 min at room temperature with 100 ml methanol-water 1:1 and then washed three times with 150 ml of acetone.

The purified material was dried in air until a constant weight was reached.

The different conditions used in runs 6.1 and 6.2 are reported in Table 6

TABLE 6

| Run | Time before funct. | GMA [M] | Reaction GMA/Aglu mol/mol | GMA/Agluc[1] mol/mol | area$_{N(ester)}$ FT-IR |
|---|---|---|---|---|---|
| 6.1 | 5 days | 1.40 | 23.0 | 6.1 | 5.29 |
| 6.2 | 8 days | 0.35 | 7.0 | 3.8 | 1.96 |

[1]By weighing

Example 7

Activation of Cotton with EB and Functionalization with GMA

A serie of runs using various cotton materials was performed according to the procedure of example 6. The runs were performed at 70° C. for an hour with a concentration of GMA 0.8 M (GMA/Agluc=5.0). Other specific conditions are reported in Table 7.

TABLE 7

| Run | Material | EB activation (kGy) | Product GMA/Agluc[1] mol/mol | area$_{N(ester)}$ FT-IR |
|---|---|---|---|---|
| 7.1 | Mercerized Cotton[2] | 100 - N$_2$ | $2.2 \, 10^{-2}$ | $4.07 \times 10^{-3}$ |
| 7.2 | Mercerized Cotton[2] | 200 - N$_2$ | 1.39 | 1.56 |
| 7.3 | Cotton[3] | 100 - N$_2$ | 2.7 | 1.72 |
| 7.4 | CottonWool[4] | 150 - N$_2$ | 0.93 | 0.65 |
| 7.5 | CottonWool[4] | 150 - Air | 0.57 | $3.36 \times 10^{-2}$ |

[1]By weighing
[2]area$_{N(ester)}$ not-treated = $9.2 \, 10^{-4}$
[3]area$_{N(ester)}$ not-treated = $3.55 \, 10^{-4}$
[4]area$_{N(ester)}$ not-treated = $4.6 \, 10^{-4}$.

Example 8

Activation of Cotton-viscose-elastan with EB and Functionalization with GMA

Two runs were performed on a cotton52% viscose43% elastan5% fiber.

The results and the conditions applied are reported in Table 8.

TABLE 8

| Run | EB (kGy) | Time before funct. | GMA [M] | Reaction GMA/Agluc[1] mol/mol | area$_{N(ester)}$ FT-IR[1] |
|---|---|---|---|---|---|
| 8.1 | 200 | 2 days | 0.8 | 13 | $3.42 \times 10^{-2}$ |
| 8.2 | 300 | — | 1.7 | 25 | 0.37 |

[1]area$_{N(ester)}$ not-treated = $5.07 \times 10^{-3}$

Example 9

Activation of Various Polysaccharides with EB and Functionalization with GMA The procedure of example 6 was applied to samples of various polysaccharides. The results and the conditions applied are reported in Table 9

TABLE 9

| Run | Material | EB activation (kGy) | Time before funct. | GMA [M] | Reaction GMA/Agluc mol/mol | area$_{N(ester)}$ FT-IR |
|---|---|---|---|---|---|---|
| 9.1 | Microcrystalline Cellulose[1] | 100 - N$_2$ | — | 0.8 | 3 | 0.10 |
| 9.2 | Microcrystalline Cellulose[1] | 200 - N$_2$ | — | 0.8 | 3 | 0.47 |
| 9.3 | Microcrystalline Cellulose[1] | 200 - Air | — | 0.8 | 3 | 0.28 |
| 9.4 | Single-filament Viscose[2] | 200 - N$_2$ | 1 day | 0.8 | 10 | $5.7 \times 10^{-2}$ |
| 9.5 | Maize Starch[3] | 200 - N$_2$ | 1 day | 0.8 | 3 | $3.11 \times 10^{-2}$ |
| 9.6 | Maize Starch[3] | 300 - N$_2$ | — | 2.0 | 3 | $7.4 \times 10^{-2}$ |

[1] area$_{N(ester)}$ not-treated = 9.2 10$^{-4}$

[2] area$_{N(ester)}$ not-treated = 1.77 10$^{-3}$; area$_{N(ester)}$ EB activated = 2.3 10$^{-2}$

[3] area$_{N(ester)}$ not-treated and treated with EB = 0.0

TABLE 10

EPR signals change in time for flax irradiated samples

| Material | Days | | | | | | |
|---|---|---|---|---|---|---|---|
| | 0 | 1 | 4 | 5 | 14 | 21 | 28 |
| Quartz Sliver 400 kGy | 7.35 E9 | 3.69 E9 | 2.24 E9 | 2.43 E9 | 1.70 E9 | 1.38 E9 | 1.22 E9 |
| Quartz Sliver 200 kGy | 5.83 E9 | 3.24 E9 | 1.93 E9 | 2.00 E9 | 1.35 E9 | 1.33 E9 | 1.06 E9 |
| Quartz Yarn 400 kGy | | 4.25 E9 | 2.3 E9 | 2.41 E9 | 1.14 E9 | 0.95 E9 | 0.86 E9 |
| Quartz Yarn 200 kGy | | 3.82 E9 | 1.25 E9 | 1.54 E9 | 1.47 E9 | 1.215 E9 | 1.01 E9 |
| Emerald Sliver 400 kGy | | 5.29 E9 | 2.5 E9 | 2.47 E9 | 1.19 E9 | 0.98 E9 | 0.91 E9 |
| Emerald Sliver 200 kGy | | 3.94 E9 | 1.79 E9 | 1.76 E9 | 1.65 E9 | 1.27 E9 | 1.03 E9 |
| Emerald Yarn 400 kGy | 8.81 E9 | 4.13 E9 | 2.57 E9 | 2.73 E9 | 1.56 E9 | 1.18 E9 | 0.99 E9 |
| Emerald Yarn 200 kGy | | 4.35 E9 | 1.74 E9 | 1.88 E9 | 1.78 E9 | 1.19 E9 | 1.10 E9 |

TABLE 11

EPR signals change in time for various irradiated (200 KGy) samples

| Material | Days | | | | | | | | |
|---|---|---|---|---|---|---|---|---|---|
| | 0 | 1 | 2 | 3 | 7 | 14 | 22 | 32 | 51 |
| Textil 1 | 3.47 E9 | 2.27 E9 | 1.95 E9 | 1.89 E9 | 1.42 E9 | 1.27 E9 | 1.13 E9 | 1.12 E9 | 1.08 E9 |
| Textil 2 | 1.92 E9 | 1.66 E9 | 1.37 E9 | 1.41 E9 | 1.13 E9 | 1.00 E9 | 0.87 E9 | 0.79 E9 | 0.89 E9 |
| Textil 3 | 3.80 E9 | 2.83 E9 | 2.59 E9 | 2.52 E9 | 2.00 E9 | 1.77 E9 | 1.55 E9 | 1.40 E9 | 1.53 E9 |
| Viscose | 4.14 E9 | 1.20 E9 | 0.81 E9 | 0.79 E9 | 0.62 E9 | 0.57 E9 | 0.50 E9 | 0.49 E9 | 0.52 E9 |
| Starch | 0.48 E9 | 0.085 E9 | 0.080 E9 | 0.050 E9 | 0.042 E9 | 0.031 E9 | 0.027 E9 | 0.024 E9 | 0.020 E9 |

Textil 1 = Cotton 52%, Viscose 43%, Elastan 5%

Textil 2 = Cotton 70%, Polyester 30%

Textil 3 = Cotton 85%, Silk 15%

TABLE 12

EPR signals change in time for various irradiated (300 KGy) samples

| Materials | Days | | | | | | | |
|---|---|---|---|---|---|---|---|---|
| | 0 | 1 | 2 | 3 | 6 | 10 | 17 | 35 |
| Cotton | 5.97 E9 | 3.85 E9 | 3.15 E9 | 3.05 E9 | 2.58 E9 | 2.19 E9 | 2.13 E9 | 1.89 E9 |
| Textil 1 | 4.80 E9 | 2.79 E9 | 2.22 E9 | 2.16 E9 | 1.80 E9 | 1.71 E9 | 1.57 E9 | 1.40 E9 |
| Starch | 0.66 E9 | 0.11 E9 | 0.061 E9 | 0.053 E9 | 0.038 E9 | 0.022 E9 | 0.020 E9 | 0.023 E9 |

Textil 1 = Cotton 52%, Viscose 43%, Elastan 5%

The invention claimed is:

1. A process for the preparation of functionalized polysaccharides or polymer fibers comprising:
   a) forming stable radicals on a polysaccharide from a chemical free radical source wherein the chemical source is Fenton's reagent;
   b) washing the reaction mixture of step a) containing the polysaccharide chain having a free radical with water and recovering said polysaccharide; and
   c) reacting, in the absence of the free radical source, an olefin containing a functional group with the stable radicals on the polysaccharide.

2. The method of claim 1, wherein the olefin containing a functional group is selected from the group consisting of glycidylmethacrylate and allylglycidylether.

3. The method of claim 1, further comprising filtering the washed reaction mixture.

4. A method for functionalizing polysacoharides using a chemical source of free radicals, which forms stable radicals on a polysaccharide structure wherein at least one of the formed radicals reacts with a functionalized olefin, comprising:
   a first step, wherein a free radical on a polysaccharide chain is formed, washing the reaction mixture of the first step containing the polysaccharide chain having a free radical with water and recovering said polysaccharide, and
   a second step, wherein said radical reacts with an the functionalized olefin in the absence of the chemical source of free radicals a radical source; wherein
   the polysaccharide is in the form of a fiber;
   the amount of functional groups introduced in the polysaccharide is between $10^{-3}$ and 2 mol olefin/eq anhydrous glucose; and the chemical source is Fenton's reagent.

5. Method according to claim 1, wherein the polysaccharide is selected from the group consisting of flax fibers, cellulose, viscose and cotton fibers.

6. Method according to claim 5, wherein the polysaccharide is used together with one or more natural or synthetic fibers.

7. Method according to claim 6, wherein the natural or synthetic fibers are selected from silk, polyamide, polyester, polyacrylate and polyolefin.

8. Method according to claim 1, wherein the stable radicals have a half-life of about 1 day.

9. Method according to claim 1, wherein the amount of functional groups introduced in the polysaccharide is between $10^{-2}$ and 1 mol olefin/eq anhydrous glucose.

10. The method of claim 1, wherein the functionalized olefin is selected from the group consisting of glycidylmethacrylate and allylglycidylether.

11. The method of claim 1, further comprising filtering the washed reaction mixture.

* * * * *